United States Patent

[11] 3,593,487

| [72] | Inventor | Keith B. Cleland |
| | | Whittier, Calif. |
| [21] | Appl. No. | 799,480 |
| [22] | Filed | Feb. 14, 1969 |
| [45] | Patented | July 20, 1971 |
| [73] | Assignee | Hunter Industries |
| | | Santa Fe Springs, Calif. |

[54] ARTICLE-HANDLING APPARATUS
6 Claims, 9 Drawing Figs.

[52] U.S. Cl. .................................................. 53/54,
53/160, 53/242
[51] Int. Cl. ............................................. B65b 5/10,
B65b 57/14
[50] Field of Search........................................ 53/52, 54,
60, 77, 160, 164, 242, 243; 198/24, 35; 214/6.2,
8.5, 300, 306, 309, 310

[56] References Cited
UNITED STATES PATENTS

| 2,869,297 | 1/1959 | Neer ............................. | 53/243 X |
| 3,092,266 | 6/1963 | DeKoning ................... | 214/6 |
| 3,340,992 | 9/1967 | Seragnoli ..................... | 198/24 |

Primary Examiner—Theron E. Condon
Assistant Examiner—Robert L. Spruill
Attorney—Harris, Kiech, Russell and Kern ABSTRACT: An apparatus for loading tiered rows of articles into and for unloading same from open-bottomed containers. The apparatus is particularly applicable to handling such light weight, slippery articles as empty plastic bottles which are to be loaded into containers at manufacturing locations for use at other locations. The apparatus includes a loader which forms the articles into rows and which inserts successive rows upwardly into successive compartments of multicompartment containers. The apparatus further includes an unloader for removing successive tiered rows from successive container compartments at a point of use.

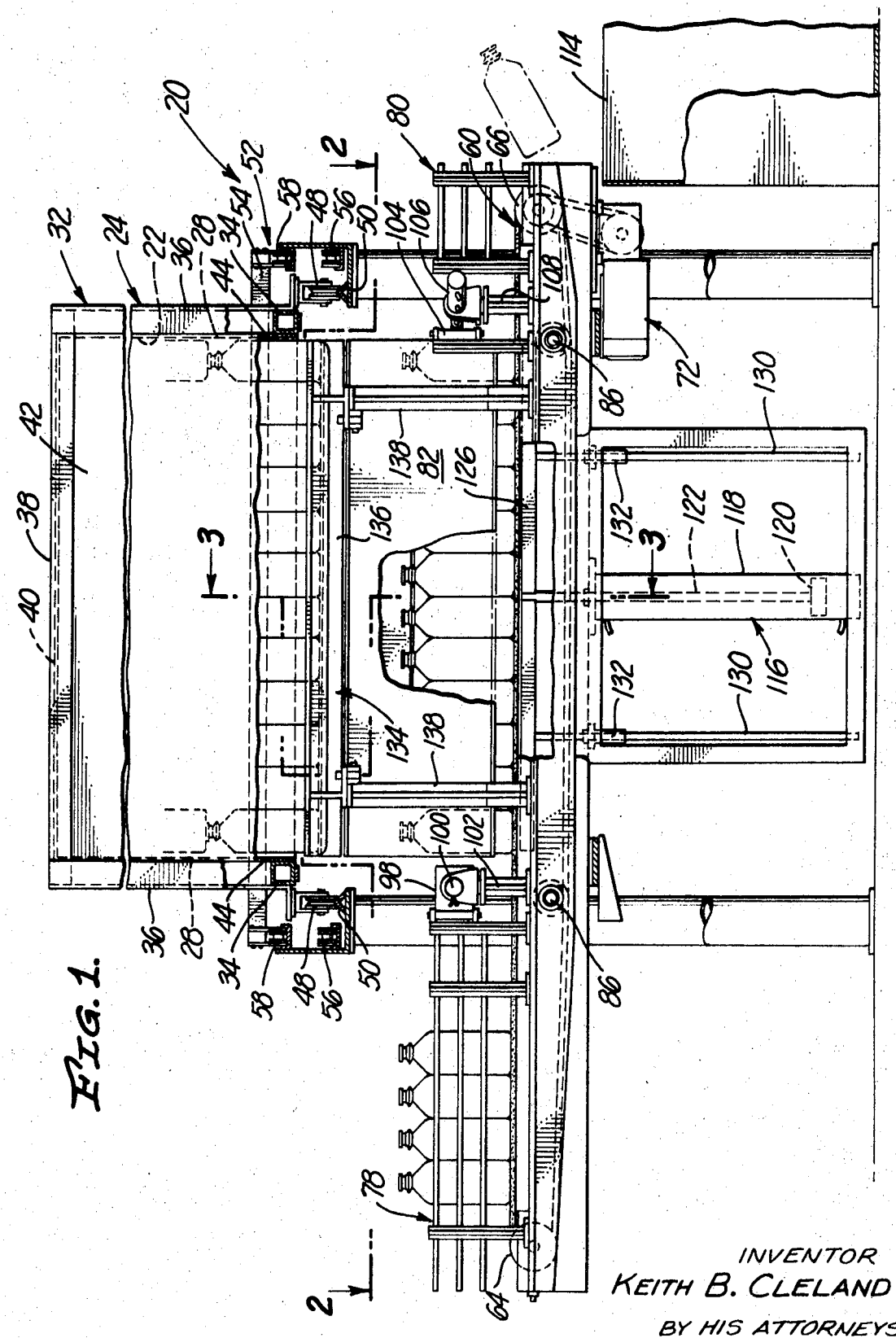

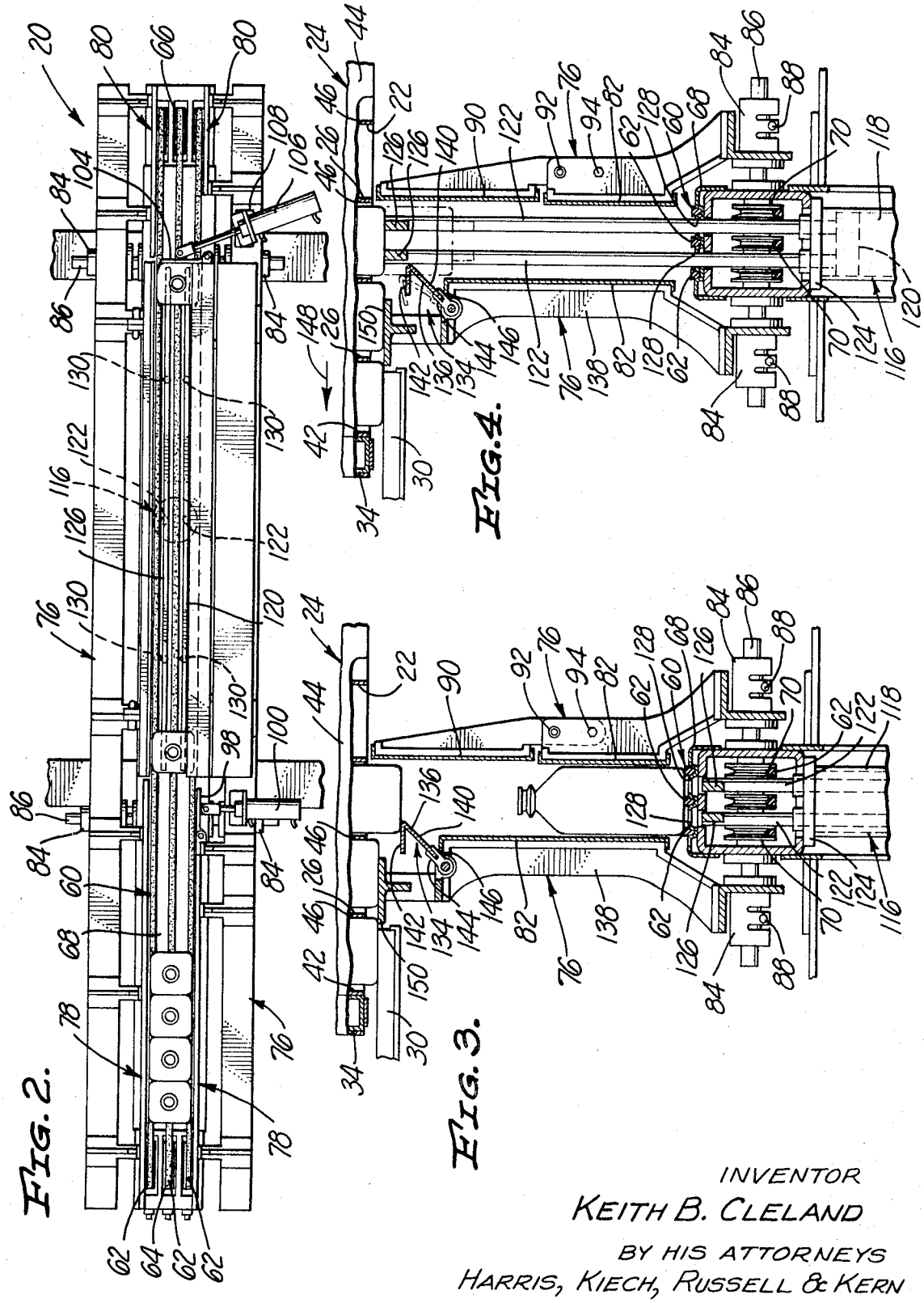

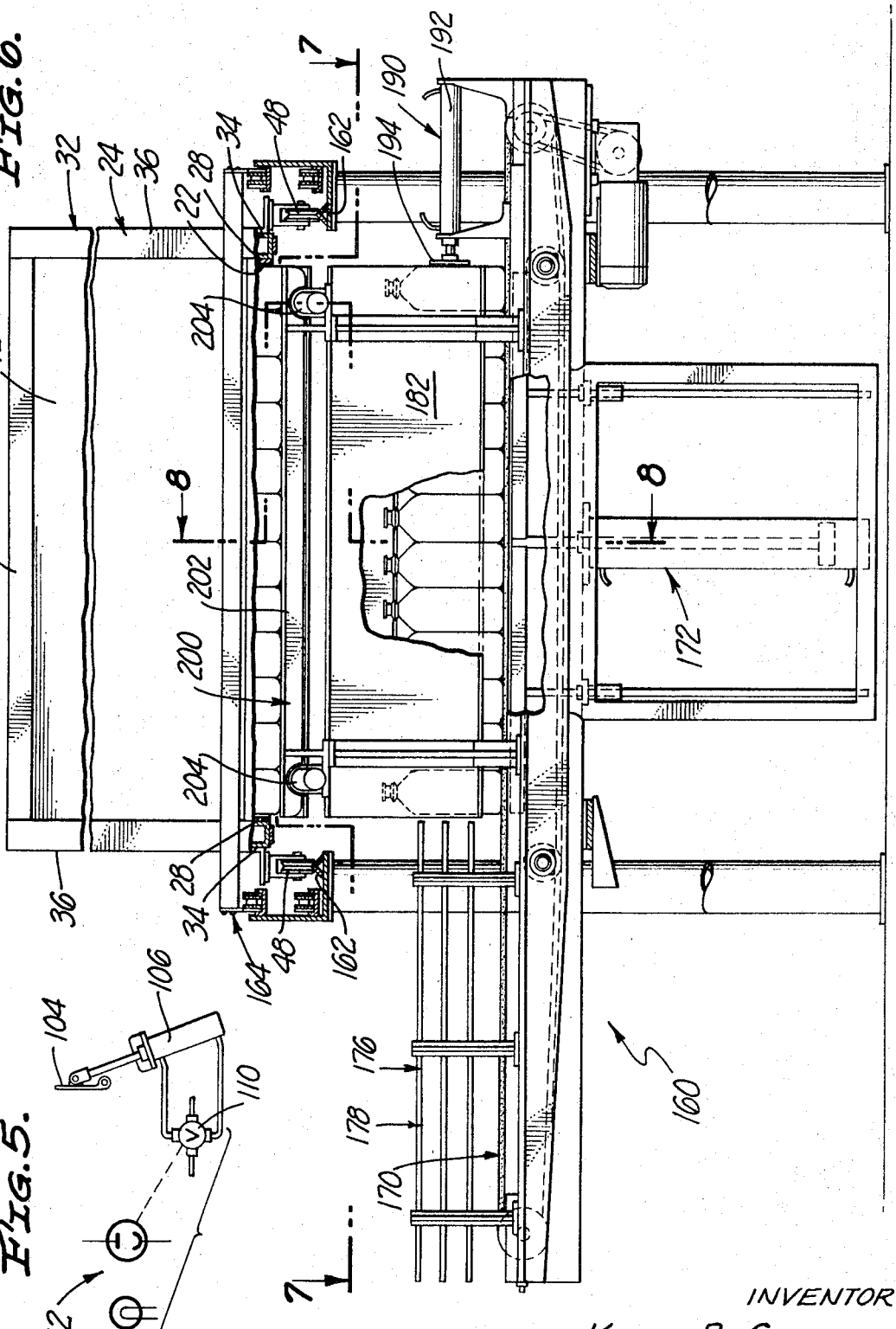

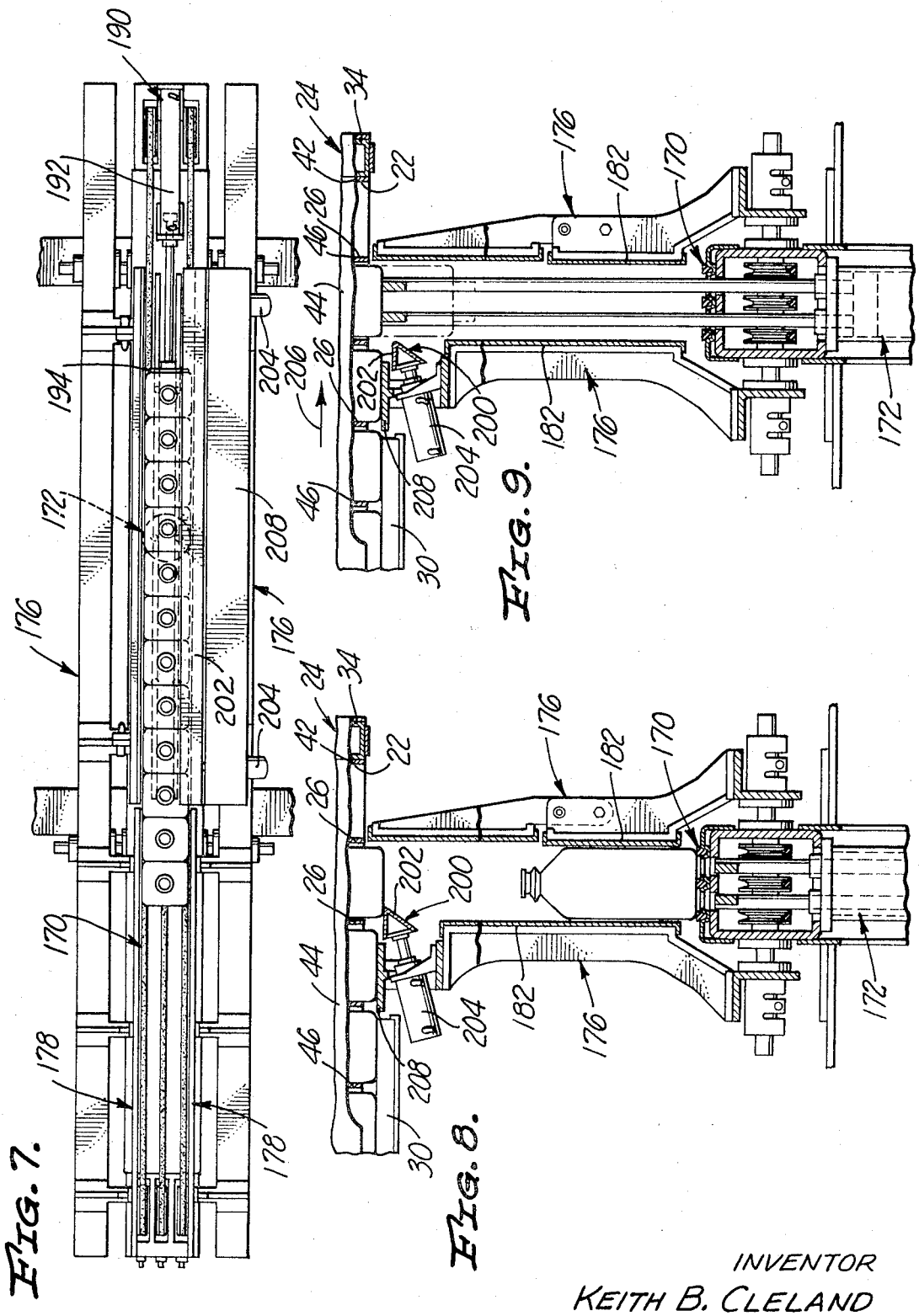

ARTICLE-HANDLING APPARATUS

CROSS-REFERENCE TO RELATED APPLICATION

This application is related to my copending U.S. Pat. application Ser. No. 604,849, filed Dec. 27, 1966 abandoned in favor of continuation application Ser. No. 824,717, filed Apr. 2, 1969, now U.S. Pat. No. 3,534,525, issued Oct. 20, 1970.

BACKGROUND OF INVENTION

The present invention relates in general to an apparatus for loading tiered rows of articles upwardly into and for removing them downwardly from complementary compartments in open-bottomed containers used to transport the articles from one location to another. More particularly, the invention relates to an article-handling apparatus which includes a loading apparatus or loader for loading tiered rows of articles upwardly into the container compartments, and an unloading apparatus or unloader for removing the tiered rows from the container compartments. During transportation and/or storage of the containers, the articles are retained therein by covers closing the open bottoms thereof.

Merely as an example, the invention is applicable to, and will be considered herein in connection with, the transportation and/or storage of plastic milk bottles from manufacture of the bottles to filling thereof. The invention may serve merely as a system for transporting the empty plastic milk bottles from the bottle-molding equipment to the bottle-filling equipment. Alternatively, it may serve as a storage system which accumulates empty plastic milk bottles molded during two or more manufacturing shifts for use during a single filling shift. This procedure minimizes the investment in and provides for more efficient utilization of the bottle-molding equipment. It will be understood that the bottle-molding equipment and the bottle-filling equipment may be many miles apart, or separated by only a few feet.

Plastic milk bottles, and other plastic containers for consumer products of various types, are light in weight when empty and are frequently made of a slippery material, such as polyethylene. Consequently, they are difficult to handle and must be restrained at all times against undesired movement in virtually all directions.

Although the invention is particularly applicable to handling empty plastic containers, and will be considered herein specifically in connection with empty plastic milk bottles, it will be understood that the invention is capable of more general utility, in that it may be utilized in the handling of other articles, and is not to be limited to the exemplary applications mentioned herein.

SUMMARY AND OBJECTS OF INVENTION

A general object of the present invention is to provide an article-handling apparatus which positively restrains the articles being handled against movements in undesired directions so that the articles are kept under control at all times.

More particularly, a basic object of the invention is to provide an article-handling apparatus which forms and inserts successive rows of articles upwardly into successive complementary compartments in an open-bottomed container, and which subsequently removes successive rows from successive compartments and delivers them to a point of use.

An important object is to provide an article-handling apparatus for use with an open-bottomed container having compartments for tiered rows of articles, comprising: conveyor means for a row of articles; means for positioning the container with the open bottom of one of its compartments above the conveyor means; elevator means for moving a row of articles vertically between the conveyor means and the interior of the compartment thereabove, through the open bottom of the compartment; and check means for supporting a row of articles above the conveyor means and within the container compartment thereabove.

Related objects are to provide an article-handling apparatus of the foregoing nature which comprises a loading apparatus or loader for inserting successive rows of articles upwardly into successive compartments of the container, and an unloading apparatus or unloader for removing successive rows of articles downwardly from successive container compartments. In the loader, the conveyor means has means associated therewith for forming articles moving in single file into rows, the elevator means serving to insert successive rows upwardly into a container compartment thereabove, and the check means serving to retain each row, and any rows thereabove, within the container compartment. In the unloader, the elevator means lowers successive rows of articles onto the conveyor means for delivery to the point of use, the check means retaining each row, and any rows thereabove, within the container compartment as the preceding row is lowered onto the conveyor means.

Another object is to move each container compartment over a cover for the open-bottomed container as it is filled with rows of articles in the loader. A related object in connection with the unloader is to move the container relative to its cover to bring successive compartments into alignment or register with the elevator means and conveyor means of the unloader.

An important object of the present invention is to provide a check means for supporting a row of articles, and any rows thereabove, within a compartment of the container, comprising a single check bar pivotable from a nonchecking position to a checking position wherein it engages the bottom of a row of articles along one side thereof to support same.

An object in connection with the loader of the invention is to provide a check bar having gravity-responsive means for biasing it towards its checking position, whereby the check bar may be pivoted into its nonchecking position by a row of articles being moved upwardly therepast, the check bar subsequently pivoting into its checking position automatically.

An object in connection with the unloader of the invention is to provide actuating means for pivoting the check bar into its nonchecking position whenever it is desired to remove a row of articles from a container compartment, the check bar in this instance being returned to its checking position by the actuating means as soon as the row being removed has passed it so that the check bar intercepts and supports the next row of articles.

An important object in connection with the loader of the invention is to provide a reject means for preventing upward insertion into a container compartment of a row of articles having therein one or more tipped articles. More particularly, an object in this connection is to provide a reject means which causes the conveyor means to dump such a row of articles from its downstream end.

Still another object of the invention in connection with the unloader thereof is to provide at the upstream end of the unloader conveyor means an accelerator means for accelerating a row of articles being lowered onto the unloader conveyor means, at least approximately to the speed of such conveyor means. With this construction, the possibility of tipping of articles being transferred to the unloader conveyor means is minimized, which is an important feature.

Yet another object of the invention is to provide an article-handling apparatus wherein the conveyor means of the loader and unloader are provided on opposite sides thereof with laterally spaced, parallel, laterally movable sidewalls the lateral spacing of which may be adjusted to accommodate articles of different widths.

Another object is to provide a loader or unloader having conveyor means which includes a plurality of conveyor belts in laterally spaced, parallel relation, at least one of such belts being between the adjustable sidewalls at their closest approach to each other.

A further object of the invention is to provide an elevator means for the loader or the unloader which includes a vertical cylinder, a piston movable in the cylinder, laterally spaced, vertical piston rods connected to and extending upwardly from the piston and adapted to straddle at least one of the conveyor belts of the corresponding conveyor means, and laterally spaced, horizontal bars connected to the upper ends of the piston rods and extending longitudinally of and adapted to straddle such conveyor belt and to support a row of articles thereon.

An additional object is to provide a loader or unloader for use with an open-bottomed, multicompartment container, each compartment of which has laterally spaced sidewalls and longitudinally spaced end walls, comprising: conveyor means for a row of articles; a housing associated with the conveyor means and having laterally spaced sidewalls on opposite sides of the conveyor means to confine a row of articles therebetween; means for positioning the container with the open bottom of one of its compartments above the conveyor means and with the sidewalls of such compartment in vertical alignment with the sidewalls of the housing; elevator means for moving a row of articles vertically between a lower position wherein it is between the sidewalls of the housing and on the conveyor means and an upper position wherein it is between the sidewalls of the container compartment and within such compartment; and check means for supporting a row of articles in such upper position to permit the simultaneous presence of a row of articles in the lower position mentioned.

The foregoing objects, advantages, features and results of the present invention, together with numerous other objects, advantages, features and results thereof which will be evident to those skilled in the article handling art in the light of this disclosure, may be achieved with the exemplary embodiments of the invention illustrated in the accompanying drawings and described in detail hereinafter.

DESCRIPTION OF DRAWINGS

In the drawings:

FIG. 1 is a view, partially in side elevation and partially in section, of a loader forming part of the article-handling apparatus of the invention;

FIG. 2 is a fragmentary plan view taken as indicated by the arrowed line 2-2 of FIG. 1;

FIG. 3 is an enlarged, fragmentary, vertical sectional view taken as indicated by the arrowed line 3-3 of FIG. 1 and showing a row of empty plastic milk bottles on a conveyor means of the loader;

FIG. 4 is a view similar to FIG. 3, but showing an elevator means of the loader in the process of moving a row of milk bottles upwardly from the conveyor means into the interior of a complementary compartment of an open-bottomed container capable of receiving tiered rows of milk bottles;

FIG. 5 is a diagrammatic view schematically illustrating a photoelectric means for operating a reject means to cause same to dump a row of milk bottles from the loader if such row contains one or more tipped bottles;

FIG. 6 is a view similar to FIG. 1, but illustrating an unloader-forming part of the article-handling apparatus of the invention;

FIG. 7 is a fragmentary plan view taken as indicated by the arrowed line 7-7 of FIG. 6;

FIG. 8 is an enlarged, fragmentary, vertical sectional view taken along the arrowed line 8-8 of FIG. 6 and illustrating a row of empty plastic milk bottles on a conveyor means of the unloader after removal from a complementary compartment of an open-bottomed container thereabove; and FIG. 9 is a view similar to FIG. 8, but showing an elevator means of the unloader in the process of lowering another row of milk bottles from the container compartment onto the conveyor means of the unloader.

DESCRIPTION OF LOADER 20

Referring initially to FIGS. 1 to 4 of the drawings, designated generally therein by the numeral 20 is a loading apparatus or loader for inserting successive rows of empty plastic milk bottles upwardly into successive complementary compartments 22 in an open-bottomed container 24. Each compartment 22 is capable of receiving a plurality of tiered rows each comprising a plurality of bottles, and the container 24 includes a plurality of such compartments in side-by-side relation. Preferably, as best shown in FIG. 2, the bottles are of square cross section, except at their upper ends, so that they have flat sides for easier handling and to minimize waste space. Each compartment 22 has sidewalls 26, FIGS. 3 and 4, laterally spaced apart a distance slightly greater than the width of a row of bottles. Each compartment 22 also has end walls 28, FIG. 1, longitudinally spaced apart a distance slightly greater than the length of a row of bottles.

When all of the compartments 22 have been filled with tiered rows of bottles, the open bottom of the container 24 is closed by a cover 30, FIGS. 3 and 4. This cover may be secured in place in any suitable manner, such as that illustrated and described in my aforementioned copending application.

Although the container 24 may have the construction disclosed in my copending application, it preferably comprises an external rectangular frame 32 composed of interconnected bottom horizontal rails 34, vertical posts 36 and top horizontal rails 38. Within and suitably connected to the external frame 32 are a top wall 40, sidewalls 42 and end walls 44. Extending between the end walls 44 and parallelling the sidewalls 42 are spaced partitions 46. The end walls 44 of the container 24 form the end walls 28 of the compartment 22. The sidewalls 26 of such compartments are formed by the container sidewalls 42 and/or partitions 46.

For maneuverability, the container 24 is provided at each end with two wheels 48 suitably mounted on the external frame 32, one of the wheels at each end of the container being visible in FIG. 1. The wheels 48 may be used to move the container 24 over any flat surface, and they are grooved to permit guided movement of the container 24 along rails 50, FIG. 1, to bring successive compartments 22 into alignment or register with the loader 20. Indexed movement of the container 24 to bring successive compartments 22 into register with the loader 20 is produced by an indexing means 52 comprising an indexing frame 54 engageable with the container and movable longitudinally of the rails 50 by suitably driven endless chains 56. More particularly, the indexing frame 54 is suitably connected to upper runs 58 of the respective chains 56.

The loader 20 includes a conveyor means 60 which conveys the bottles single file into a position beneath the container compartment 22 being filled with tiered rows of bottles. The conveyor means 60 includes a plurality, and preferably three, V-belts 62 trained at their ends around pulleys 64 and 66. The upper runs of the belts 62 are disposed in complementary guide grooves, best shown in FIGS. 3 and 4, in a guide plate 68 extending substantially from the pulleys 64 to the pulleys 66. The lower runs of the belts 62 are trained under and guided by idler pulleys 70. A suitable drive means 72 connected to the pulleys 66 drives the belts 62 in a direction to move the upper runs thereof from left to right, as viewed in FIG. 1.

With the foregoing three-belt construction for the conveyor means 60, bottles of various widths can be accommodated, a narrow bottle being conveyed by the central belt 62 only, and a wider bottle being conveyed by all three belts. The loader 20 is provided on opposite sides of the conveyor means 60 with laterally spaced guide assemblies 76 which are laterally adjustable to vary the distance therebetween to accommodate bottles of different widths. In FIGS. 3 and 4, the guide assemblies 76 are shown adjusted to accommodate bottles of intermediate widths.

More particularly, the guide assemblies 76 include upstream guide rails 78 on opposite sides of the conveyor means 60 at the upstream end thereof, and downstream guide rails 80 on opposite sides of the conveyor means at the downstream end thereof. The guide assemblies 76 provide, intermediate the upstream and downstream guide rails 78 and 80, a housing adapted to confine a row of bottles to be inserted into the container compartment 22 thereabove, and comprising laterally spaced sidewalls 82 respectively substantially aligned with the sidewalls 26 of the corresponding container compartment 22. Each sidewall 82 is substantially aligned with the corresponding upstream and downstream guide rails 78 and 80, in the direction of movement of the conveyor means 60.

Considering the manner in which the lateral spacing between the two guide assemblies 76 may be adjusted to accommodate bottles of different widths, each guide assembly is provided with two longitudinally spaced bearings 84 respectively laterally slidable on laterally extending shafts 86, as best shown in FIGS. 3 and 4. As will be apparent, the lateral spacing of the guide assemblies 76 may be varied as required simply by sliding them back and forth on the shafts 86, and then locking them in place with clamping means 88 incorporated in the respective bearings 84.

As best shown in FIGS. 3 and 4, the lower edges of the sidewalls 82 are above the plane of the upper runs of the conveyor belts 62 to permit inward adjustments to accommodate a bottle having a width less than the distance between the two outer conveyor belts. One of the sidewalls 82, as best shown in FIGS. 3 and 4, has an upper portion 90 which is pivoted at 92 for downward and outward movement away from the other sidewall 82 for access to a row of bottles on the conveyor means 60 between the two sidewalls, or for access to the lowest row of bottles in the corresponding container compartment 22, should access to either be necessary for any reason. Lock pins 94 through the pivoted portion 90 lock it in its vertical position.

Intermediate the upstream guide rails 78 and the sidewalls 82 of the loader housing is an upstream gate means or gate 98 which is pivotable into a position to intercept a file of bottles being conveyed by the conveyor means 60, after the number of bottles necessary to form a complete row has been admitted into the space between the sidewalls 82. In the particular construction illustrated, the upstream gate 98, as best shown in FIG. 2, is pivotable about a vertical axis, between intercepting and nonintercepting positions, by an air cylinder 100 pivotally connected thereto. This air cylinder is mounted on a pedestal 102, FIG. 1, for pivotal movement about a vertical axis as it is extended and contracted to move the upstream gate 98 between intercepting and nonintercepting positions. The air cylinder 100 may be actuated to move the upstream gate 98 into its intercepting position, after the desired number of bottles has passed, in any suitable manner, as disclosed, for example, in my aforementioned copending application, which shows and describes a photocell operating a counter as the bottles pass a light beam acting on the photocell.

The loader 20 also includes a downstream gate 104 movable between intercepting and nonintercepting positions. When in its intercepting position, the downstream gate 104 constitutes a downstream end wall of the loader housing and is substantially aligned with the corresponding end wall 28 of the container compartment 22 which is in loading position above the conveyor means 60. As shown in FIG. 2, the downstream gate 104 is also pivotable about a vertical axis between its intercepting and nonintercepting positions, and is controlled by an air cylinder 106 pivotally connected thereto. The air cylinder 106 is mounted on a pedestal 108 for pivotal movement about a vertical axis as it extends and contracts to move the downstream gate 104 between its intercepting and nonintercepting positions.

Referring to FIG. 5, the air cylinder 106 is controlled by a selector valve 110 which, in turn, is controlled by a photoelectric means 112 responsive to the presence of one or more tipped bottles, not shown, in a row on the conveyor means 60 below the container compartment 22 being loaded. The photoelectric means 112 is shown schematically for convenience as comprising a single photocell and light source. However, it will be understood that any suitable construction may be used. For example, there may be one photocell for each bottle in the row between the sidewalls 82, one or more light sources being so positioned as to cause light to reach a particular photocell if a bottle corresponding to that photocell is tipped. For another example, a single photoelectric means 112 operating as a bottle counter may be timed so as to activate gate 104 upon detecting any unusually long delay in counting the proper number of bottles entering the loader housing between walls 82, which would occur should one or more bottles tip over and block the entrance of the proper number of bottles. Still another example would be the vertical positioning of two photocells, one above the other, at the entrance point where the bottles enter the loader housing. The lower photocell would have its light beam traversing the path of the lower half of the bottles and the upper its light beam traversing the path of the bottle necks. Should a bottle tip over before passing the two photocells, the top cell would not receive an interrupted signal and therefore would activate gate 104. Should a bottle tip over after passing the two photocells, the top cell, timed to operate the elevator means when the neck of the last bottle in a row is stopped in front of it for an unusual length of time, would also be timed to operate gate 104 should this interrupting signal not be received for an unusual length of time.

In any event, when the photoelectric means 112 detects one or more tipped bottles in a row to be loaded upwardly into a container compartment 22, by whatever means used, the photoelectric means actuates the selector valve 110 to cause the air cylinder 106 to move the downstream gate 104 to a nonintercepting position. This enables the conveyor means 60 to reject a row of bottles containing one or more tipped bottles, as by discharging same into a suitable receptacle 114, FIG. 1, at and below the downstream end of the conveyor means. Thus, this construction provides a reject means for preventing the upward insertion into a container compartment 22 of a row of bottles containing one or more tipped bottles, or a row improperly formed in other ways.

The loader 20 includes an elevator means 116 for moving a row of articles upwardly from the conveyor means 60 into a container compartment 22 thereabove, through the open bottom of such container compartment. The elevator means 116 includes a vertical cylinder 118, preferably pneumatic, which contains a vertically movable piston 120 having laterally spaced, vertical piston rods 122 connected to the piston and extending upwardly therefrom through a complementary cylinder head 124 having two laterally spaced bores therethrough for the respective piston rods.

As best shown in FIGS. 3 and 4, the two piston rods 122 are laterally spaced a distance such that they are capable of straddling the central conveyor belt 62, and carry at their upper ends laterally spaced, horizontal elevator bars 126 which extend longitudinally of the conveyor means 60 and are adapted to support a row of bottles thereon. It will be noted that the guide plate 68 is provided therein with longitudinal slots 128 through which the elevator bars 126 are upwardly movable.

Providing the piston 120 with the two laterally spaced piston rods 122 carrying the two laterally spaced, longitudinal elevator bars 126 is an important feature since it provides a very simple elevator means 116 capable of straddling the central conveyor belt 62. To stabilize the elevator means 116 against cocking in the longitudinal direction, the elevator bars 126 are provided adjacent each end of the elevator means with depending guide rods 130, FIGS. 1 and 2, vertically movable in suitable guide bearings 132.

As indicated earlier herein, the loader 20 also includes a check means 134 for supporting a row of bottles in an upper position spaced upwardly from the conveyor means 60 and within the container compartment 22 thereabove. The check means 134 includes a single check bar 136 which extends longitudinally of the conveyor means 60 at a distance substantially equal to the length of a row of bottles to be inserted into the container compartment 22 thereabove. The check bar 136 is mounted for pivotal movement, about an axis extending longitudinally of the conveyor means 60, on posts 138 forming part of one of the guide assemblies 76 and carrying one of the sidewalls 82.

The check bar 136 has the shape of an acute angle in cross section, as best shown in FIGS. 3 and 4, and includes flanges 140 and 142. The flange 140 is connected to pivot elements 144 which form part of the pivot means providing for pivotal movement of the check bar 136 about the aforementioned axis extending longitudinally of the conveyor means 60.

When the check bar 136 is in the position shown in FIG. 3, its weight acts as a gravity responsive means for biasing it in the clockwise direction. Clockwise pivoting of the check bar 136 beyond the position shown in FIG. 3 is prevented by engagement of the pivot elements 144 with stops 146 forming part of the corresponding guide assembly 76. Under such conditions, the check bar 136 assumes the position shown in FIG. 3, wherein the flange 140 is inclined upwardly and inwardly relative to the space between the two sidewalls 82, and wherein the flange 142 is substantially horizontal to support a row of bottles, as shown in FIG. 3.

As will be clear from FIG. 4, when the elevator means 116 lifts a row of bottles upwardly into a container compartment 22 thereabove, the tops of the bottles in such row first engage the bottoms of the bottles in a preceding row, if there is one in the container compartment 22 in question, and moves same upwardly therein. Thereafter, the shoulders of the bottles in the row on the elevator means 116 engage the inclined flange 140 of the check bar 136 to pivot the check bar into a nonchecking position, shown in dotted lines in FIG. 4. As soon as the elevator means 116 has lifted the row of bottles past the check bar 136, the action of gravity on the check bar promptly causes it to return to the solid-line position of FIG. 4, whereupon downward movement of the elevator means will seat the row of bottles carried by the elevator means on the check bar 136, as shown in FIG. 3. The elevator means 116 is then free to return to its lowermost position, shown in FIG. 3, to permit the conveyor means 60 to receive another row of bottles between the downstream gate 104 and the upstream gate 98.

It will thus be apparent that the invention provides a very simple and self-actuated check means 134 for retaining each row of bottles in one of the container compartments 22 as it is moved upwardly into such compartment by the elevator means 116.

It is thought that the operation of the loader 20 in inserting successive rows of bottles upwardly into a particular container compartment 22 will be clear from the foregoing, so that no further description is necessary. As each container compartment 22 is filled with tiered rows of bottles, the indexing means 52 displaces the container 24 one step to bring the next container compartment 22 into loading position above the conveyor and elevator means 60 and 116. With the particular construction illustrated, such indexing movement is to the left, as viewed in FIGS. 3 and 4, and as indicated by the arrow 148. As the container 24 is indexed one step by the indexing means 52, the lowermost row of bottles in a previously filled compartment 22 slides from the elevator means 116 onto a narrow supporting platform or threshold 150 carried by the same guide assembly 76 which carries the check means 134. This will be clear from FIG. 4 of the drawings. When the container 24 is subsequently indexed another step, the bottom row of bottles in the first-filled container compartment 22 slides from the threshold 150 onto the cover 30, as will also be clear from FIG. 4. Ultimately, when all of the container compartments 22 have been filled, the container 24 is displaced horizontally by the indexing means 52, in the direction of the arrow 148 of FIG. 4, until the bottom rows of articles in all of the container compartments are supported by the cover 30. Thereupon, the cover 30 may be secured to the container 24, as disclosed, for example, in my aforementioned copending application. The loaded container 24 may then be rolled, on the wheels 48, to any desired location, such as a point of use, a point of storage, a vehicle for transporting it to another location, and the like.

Description of Unloader 160

Turning now to FIGS. 6 to 9 of the drawings, designated generally therein by the numeral 160 is an unloading apparatus or unloader for removing successive rows of bottles downwardly from successive compartments 22 of the open-bottomed container 24. The unloader 160 is identical or similar to the loader 20 in many respects, merely operating in a reverse sense. Consequently, only the differences will be considered in detail.

The unloader 160 includes rails 162, FIG. 6, on which the grooved wheels 48 of the container 24 may run. Indexed movement of the container 24 to bring successive compartments 22 into register with the unloader 160 is produced by an indexing means 164 similar to the indexing means 52 of the loader 20.

The unloader 160 includes a conveyor means 170 onto which successive rows of bottles from a container compartment 22 thereabove are deposited by an elevator means 172. The conveyor means 170 comprises a three-belt system similar to that of the conveyor means 60 so that no further description is necessary. The elevator means 172 is identical to the elevator means 116 of the loader 20 and thus needs no further description.

The unloader 160 is provided on opposite sides of the conveyor means 170 with laterally spaced guide assemblies 176 which are generally similar to the guide assemblies 76 of the loader 20. More particularly, the guide assemblies 176 include downstream guide rails 178 on opposite sides of the conveyor means 170 at the downstream end thereof, and include, upstream from the guide rails 178, laterally spaced sidewalls 182 respectively substantially aligned with the sidewalls 26 of a container compartment 22 in unloading position above the conveyor and elevator means 170 and 172. The sidewalls 182 form an unloader housing in much the same way as the sidewalls 82 form a loader housing, and have essentially the same construction. Also, the guide assemblies 176 are laterally adjustable in much the same manner as the guide assemblies 76 to accommodate bottles of different widths. Consequently, further descriptions of these components would be superfluous.

The unloader 160 does not contain components corresponding to the upstream and downstream gates 98 and 104 of the loader 20. A row of bottles deposited on the conveyor means 170 is moved uninterruptedly the downstream direction, i.e., to the left as viewed in FIG. 6 and 7, to equipment, not shown, for filling the bottles.

The unloader 160 is provided at the upstream end of the conveyor means 170 with an accelerator means 190 for accelerating a row of bottles being lowered onto the conveyor means at least approximately to the speed of the conveyor means, while such row of bottles is confined between the two guide assemblies 176. This minimizes the possibility of tipping over some or all of the bottles in the row as the row is deposited on the moving conveyor means 170. The accelerator means 190 includes a horizontal cylinder 192, preferably pneumatic, aligned with the conveyor means 170 and located above the upstream end of the conveyor means a distance approximately equal to the spacing of the center of gravity of each bottle above the bottom thereof. The piston rod of the cylinder 192 projects axially therefrom in the downstream direction and carries a pusher element 194 engageable with the upstream side of the upstream bottle in a row being deposited on the conveyor means 170 by the elevator means 172. The cylinder 192 is operated to displace the pusher element 194 downstream at substantially the instant that the row of bottles is placed on the conveyor means 170, whereby the row of bottles is accelerated to approximately the speed of the conveyor means to minimize the possibility of tipping the bottles.

The unloader 160 includes a check means 200 comprising a single longitudinal check bar 202 similar to the check bar 136. However, instead of being pivoted and gravity operated, the check bar 202 is carried by the piston rods of and is positively operated by two longitudinally spaced cylinders 204, preferably pneumatic cylinders. As will be apparent, and as shown in FIGS. 8 and 9, the cylinders 204 may be operated to extend and retract the check bar 202 between checking and nonchecking positions. When the check bar 202 is in its checking position, as shown in in FIG. 8, it supports the lowermost row of bottles in the corresponding container compartment 22, and any rows of bottles thereabove. When it is desired to remove a row of bottles, the elevator means 172 is moved upwardly into engagement therewith, as shown in FIG. 9, and the check bar 202 is retracted to its nonchecking position. After this row of bottles has been lowered sufficiently to locate the shoulders on the bottles below the check bar 202, the check bar is returned to its checking position to intercept and support the next row of bottles in the container compartment 22 in question, as well as any rows of bottles thereabove.

The overall operation of the unloader 160 is essentially the reverse of that of the loader 20. Briefly, as each container compartment 22 is emptied of the tiered rows of bottles therein, the indexing means 164 is caused to index the container 24 one step, as indicated by the arrow 206 in FIG. 9. This is done with the elevator means 172 extended and the check means 200 retracted, thereby transferring the bottom row of bottles in the next compartment 22 to be unloaded onto the elevator means. Meanwhile, the bottom row of bottles in the next container compartment 22 is transferred to a threshold 208 from the container cover 30. The tiered rows of bottles in the remaining container compartments 22 are supported by the container cover 30.

Conclusion

It will be understood that the loader 20 and the unloader 160 are preferably operated automatically by suitable control systems, not shown, which actuate the various components at the proper times in the operating cycles. Such control systems can readily be provided by persons skilled in the art and are therefore not illustrated or described.

Although exemplary embodiments of the invention have been disclosed for purposes of illustration, it will be understood that various changes, modifications and substitutions may be incorporated in such embodiments within the scope of the invention.

I claim:

1. In an article-handling apparatus for use with an open-bottomed container for rows of articles, the combination of:
   a. conveyor means for a row of articles;
   b. means for positioning the container with its open bottom above said conveyor means;
   c. elevator means for moving a row of articles upwardly from said conveyor means into the interior of the container, through the open bottom of the container; and
   d. reject means for preventing the upward insertion into said container of a row of articles having therein one or more tipped articles.

2. An article-handling apparatus according to claim 1 wherein said reject means includes means for displacing out of register with said elevator means a row of articles having therein one or more articles.

3. An article-handling apparatus as defined in claim 2 including gate means traversing said conveyor means at the downstream end of said elevator means for intercepting a row of articles on said conveyor means, said reject means including means for opening said gate means in the event said gate means intercepts a row of articles having therein one or more tipped articles, whereby such row is displaced out of register with said elevator means by said conveyor means.

4. In an article-handling apparatus for use with an open-bottomed container for tiered rows of articles, the combination of:
   a. conveyor means for a row of articles;
   b. laterally spaced, parallel, laterally movable sidewalls on opposite sides of and above said conveyor means for retaining articles on said conveyor means;
   c. means for adjusting the lateral spacing of said sidewalls to accommodate articles of different widths;
   d. means for positioning the container with its open bottom above said conveyor means and said sidewalls;
   e. elevator means for moving a row of articles vertically between said conveyor means and the interior of the container, through the open bottom of the container; and
   f. check means for supporting a row of articles above said conveyor means and in the container.

5. An article-handling apparatus as set forth in claim 4 wherein said conveyor means comprises a plurality of conveyor belts in laterally spaced, parallel relation at least one of which is between said sidewalls at their closest adjusted approach to each other.

6. In an article-handling apparatus for use with an open-bottomed container for tiered rows of articles and having laterally spaced sidewalls and longitudinally spaced end walls, the combination of:
   a. conveyor means for a row of articles;
   b. a housing having laterally spaced sidewalls on opposite sides of said conveyor means to retain a row of articles on said conveyor means;
   c. means for positioning the container with its open bottom above said conveyor means and with its sidewalls in vertical alignment with said sidewalls of said housing;
   d. elevator means for moving a row of articles vertically between a lower position wherein said row of articles is between said sidewalls of said housing and on said conveyor means and an upper position wherein said row of articles is between the sidewalls of the container and within the container;
   e. check means for supporting a row of articles in said upper position to permit the simultaneous presence of a row of articles in said lower position;
   f. said housing including upstream and downstream end walls respectively traversing said conveyor means adjacent the upstream and downstream ends thereof and retractable out of the path of said conveyor means;
   g. means for retracting said upstream end wall to admit a row of articles to said lower position; and
   h. means for retracting said downstream end wall in the event that a row of articles is admitted to said lower position containing one or more tipped articles, whereby such row is displaced out of said lower position by said conveyor means.